United States Patent [19]

Weisser

[11] Patent Number: 4,939,729

[45] Date of Patent: Jul. 3, 1990

[54] PROCESS FOR THE SWITCHING OF ASYNCHRONOUS DIGITAL SIGNALS AND DEVICE FOR THE IMPLEMENTATION OF THIS PROCESS

[75] Inventor: Alain Weisser, Clamart, France

[73] Assignee: Etablissement Public De Diffusion Dit Telefiffusion De France, Paris, France

[21] Appl. No.: 179,257

[22] Filed: Apr. 8, 1988

[30] Foreign Application Priority Data

Apr. 10, 1987 [FR] France ................................ 87 05135

[51] Int. Cl.[5] ................................................ H04J 3/04

[52] U.S. Cl. .................................... 370/112; 307/243; 328/104; 340/825.03; 370/119

[58] Field of Search ............... 370/112, 111, 108, 101, 370/100, 91, 49, 48, 119; 307/244, 243; 328/61, 104; 381/2, 6, 10, 14, 80, 81; 358/14, 15, 185; 340/825, 825.03, 825.14, 825.2

[56] References Cited

U.S. PATENT DOCUMENTS

| | | | |
|---|---|---|---|
| 3,598,922 | 4/1971 | Ainsworth | 370/113 |
| 3,832,690 | 8/1974 | McVoy et al. | 328/104 |
| 4,017,687 | 4/1977 | Hartzler et al. | 370/6 |
| 4,325,147 | 4/1982 | Rothlauf | 370/91 |
| 4,471,481 | 9/1984 | Shaw et al. | 370/101 |
| 4,660,195 | 4/1987 | Hatabe | 370/101 |
| 4,675,905 | 6/1987 | Flora et al. | 381/81 |
| 4,773,068 | 9/1988 | Korsky | 370/119 |

FOREIGN PATENT DOCUMENTS 3613475 1/1987 Fed. Rep. of Germany .

OTHER PUBLICATIONS

French Patent Application No. 2,313,827, Dec. 31, 1976.

British Patent Application No. 2,140,248 (Soundout Laboratories Ltd.), Nov. 21, 1984.

*Primary Examiner*—Benedict V. Safourek
*Assistant Examiner*—Wellington Chin
*Attorney, Agent, or Firm*—Pearne, Gordon, McCoy & Granger

[57] ABSTRACT

The switching device includes a multiplexer (2) and a control device (8). The multiplexer has a first input ($Y_i$) for receiving a first digital signal (S1), a second input ($Y_j$) for receiving a second digital signal (S2), an output to emit a resultant digital signal (SR), and at least one control input. The control device send signals to the multiplexer's control inputs for switching the multiplexer from the first input to the second input and to introduce during the switching a characteristic sequence into the multiplexer output. This sequence may, in particular, be produced by a clock signal generator connected to a third input of the multiplexer.

10 Claims, 4 Drawing Sheets

PROCESS FOR THE SWITCHING OF ASYNCHRONOUS DIGITAL SIGNALS AND DEVICE FOR THE IMPLEMENTATION OF THIS PROCESS

BACKGROUND OF THE INVENTION

The invention relates to the selection and switching of digital signals on a digital network.

This invention is applicable in any area in which it is necessary to switch asynchronous digital signals in which each digital signal is made up of a series of independent units of data, such as a series of frames, which may consist of information bits plus overhead bits, such as synchronizing preambles, control codes and the like.

The invention is especially useful in audio-visual production or transmission centers, in which switching networks are used to establish lines of communication between different equipment through link switching. In the following description, this application will be referred to as an example.

According to standards set by the C.C.I.R., the digital audio signals are exchanged between equipment in an audio-visual transmission or production by means of a serial interface, known as a UER/AES studio interface. The digital signal emitted by an interface is organized in frames of 64 bits, which allow the transmission of digitized left and right signals for a stereophonic program (24 possible information bits and 8 overhead bits per each of 2 channels). For example, with a sample signal frequency of 48 kilohertz, the line output is 3.072 megabits per second.

The signal sent on the line is coded in a biphase code, which provides important redundancy for the transmitted signal. This signal contains all the synchronization data necessary and, in particular, the timing bits and sampled signals. Synchronization at the level of the sampled signal is obtained by the use of preambles which break the coding principles of the biphase code.

The serial structure of the UER/AES interface lends itself well to the setting up of switching networks of the spatial type, which are a functional replica of the switching networks used for analog signals. The switching consists of sending the signal present on the appropriate network input to a given network output, with the assistance of a multiplexer, as shown in the drawing in FIG. 1.

This switching device consists mainly of a multiplexer (2) which has, for example, 16 inputs $Y_0$, $Y_1$, . . . , $Y_{15}$, and one output. It also has 16 input stages $4_0$, $4_1$, . . . , $4_{15}$ to adapt a signal received from a standardized interface to make it compatible with the multiplexer, for example, to convert a signal which follows the RS432 standard, received from the UER/AES interface, into a TTL signal. The switching device has an output stage (6) in order to adapt the signal emitted by the multiplexer (2) to make it compatible with the standarized interfaces.

This spatial switching system has the advantage, by comparison with the temporal type of switching used in the standard way in automatic telephone switching, of not requiring exact synchronization between the digital signals to be switched.

The switching system shown in FIG. 1 thus makes it possible to provide switching between the digital signals emitted from interfaces, whose frames are not in phase, either because the sample frequencies are slightly different, or because the transit time between the equipment and the cables used do not match.

Generally, switching between two digital audio signals is accomplished in a crude fashion, without filtering. This can give rise to sound discontinuities in the form of a click. These defects, whose maximum amplitude varies with the level of the sound program, are acceptable in a number of significant applications. However, it may happen that this switching leads to a high-amplitude click, even in the presence of a low-level sound signal.

These defects may appear during switching between two asynchronous digital audio signals. Such a situation is shown in FIG. 2. A switching is carried out between a signal, S1, made up of a series of frames i, i+1, i+2, . . . and a signal, S2, made up of a series of frames j, j+1, j+2, . . . The switching takes place during the i+1 frame for the S1 signal and the j+1 frame for the S2 signal.

The SQ sequence between the i frame and the j+2 frame of the resulting signal, SR, is an abnormal sequence, first of all, due to its length, and secondly, because it is not a frame. In a conventional arrangement, an appropriately designed receiver can recognize this anomaly, due to the discontinuity of the frame timing in the resulting signal, SR, and use known methods of simulation, for example, by repetition or interpolation, to re-create the missing sample signals in the resultant signal, SR.

In contrast, when the two signals switched are synchronous, no timing discontinuity can be detected by the receiver. FIG. 3 illustrates such a switching.

Digital signals S1 and S2 are synchronous. The SR signal which results from the switching is therefore made up of a series of frames, because the SQ sequence, composed of the beginning of the i+1 frame of the S1 signal and the end of the j+1 frame of the S2 signal, also has a frame structure.

The receiver which receives the SR resultant signal cannot therefore detect the switching and interprets the erroneous data contained in the abnormal SQ sequence. The switching can be then indicated, during the sound reconstruction of the digital signal, by a loud high amplitude click.

The results of the switching during the transmission of sample data from a frame is shown on FIG. 4, in the case where the frames of the two digital audio signals are synchronous. The data elements, D1 and D2, are contained in the frames i+1 and j+1, respectively, (cf.: FIG. 3) and each represents the coded value of the sample of an audio signal. These sample signals are additionally coded in pairs, typically on 16 bits, that is, within the interval −32768 to +32767.

The data element D1, with a value of 0, represents a sample of the 0 level, emitted in complete silence. Similarly, data element D2, made up of a series of "1" symbols, represents a sample of the −1 level, that is, a negative audio signal with a very low relative amplitude.

The data element, DR, resulting from the switching between D1 and D2 is a sample signal with a relatively high amplitude, that is, a sample signal for a level very different from each of the two signals which have been switched. During the reconstruction of the audio signal, a high amplitude parasite sample signal, which is perceived as a loud click, therefore appears upon switching.

A method for reducing this problem may consist of carrying out the switching at a predetermined point in the frames, for example, during a preamble of auxiliary data or during less significant bits of sample signals. However, such a method, comparable to the one used in video applications in which switching is carried out while suppressing the raster, would necessitate the extraction of the frame timing of at least one of the two signals. The latter would singularly complicate the switching method and would not make it possible to improve the situation when the frames are not synchronous.

SUMMARY OF THE INVENTION

The purpose of the invention is a simple switching process, which would be detectable by the receiver which receives the signal resulting from the switching. Since the switching is recognized by the receiver, the later may use conventional methods for masking the switching.

Precisely stated, the purpose of the invention is a process for the switchinng of asynchronous digital signals, to produce a signal resulting from the switching between a first digital signal and a second digital signal, said first and second signals being made up of a series of asynchronous frames. This process is characterized by the fact that it consists of introducing into the resulting signal, during switching, a characteristic sequence between the above-indicated first signal and the above-indicated second signal.

According to a first method of implementation, the characteristic sequence referred to is a predetermined digital signal which violates the code used to represent the data contained in the first or the second digital signal. This predetermined digital signal may, in particular, be a clock signal.

According to a second method of implementation, the above characteristic sequence consists of a constant state.

The invention also has as its purpose a system for switching of asynchronous digital signals in order to produce a signal resulting from the switching between a first digital signal and a second digital signal, said first and second signals being made up of a series of asynchronous frames. The system is characterized by the fact that it includes:

a multiplexer which has a first input to receive the first digital signal, a second input to received the second digital signal, an output to emit a resultant signal—said multiplexer has in addition at least one control input—and a control system to deliver control signals to the control inputs of the multiplexer in order to switch said multiplexer from the first input to the second input and to introduce, during the switching, a characteristic sequence into the multiplexer output.

According to a first method of implementation, the system has, in addition, a device to synthesize a predetermined digital signal, and the multiplexer has a third input which receives said predetermined digital signal, and the control device controls the emission of said predetermined digital signal as a characteristic sequence during switching.

According to the preferred method, the predetermined digital signal is a violation of the code used for the coding of the data in the first or in the second digital signal. In particular, the emission device may be a clock generator.

According to a second method of implementation, said control device is connected to a selection input on the multiplexer, and the above characteristic sequence consists of a constant state associated with an inhibition of the multiplexer.

The characteristics and advantages of the invention will become more apparent in the following description, which is not limitative and is given as an illustration, and refers to the attached drawings:

DESCRIPTION OF THE PREFERRED EMBODIMENTS

Figure 5:
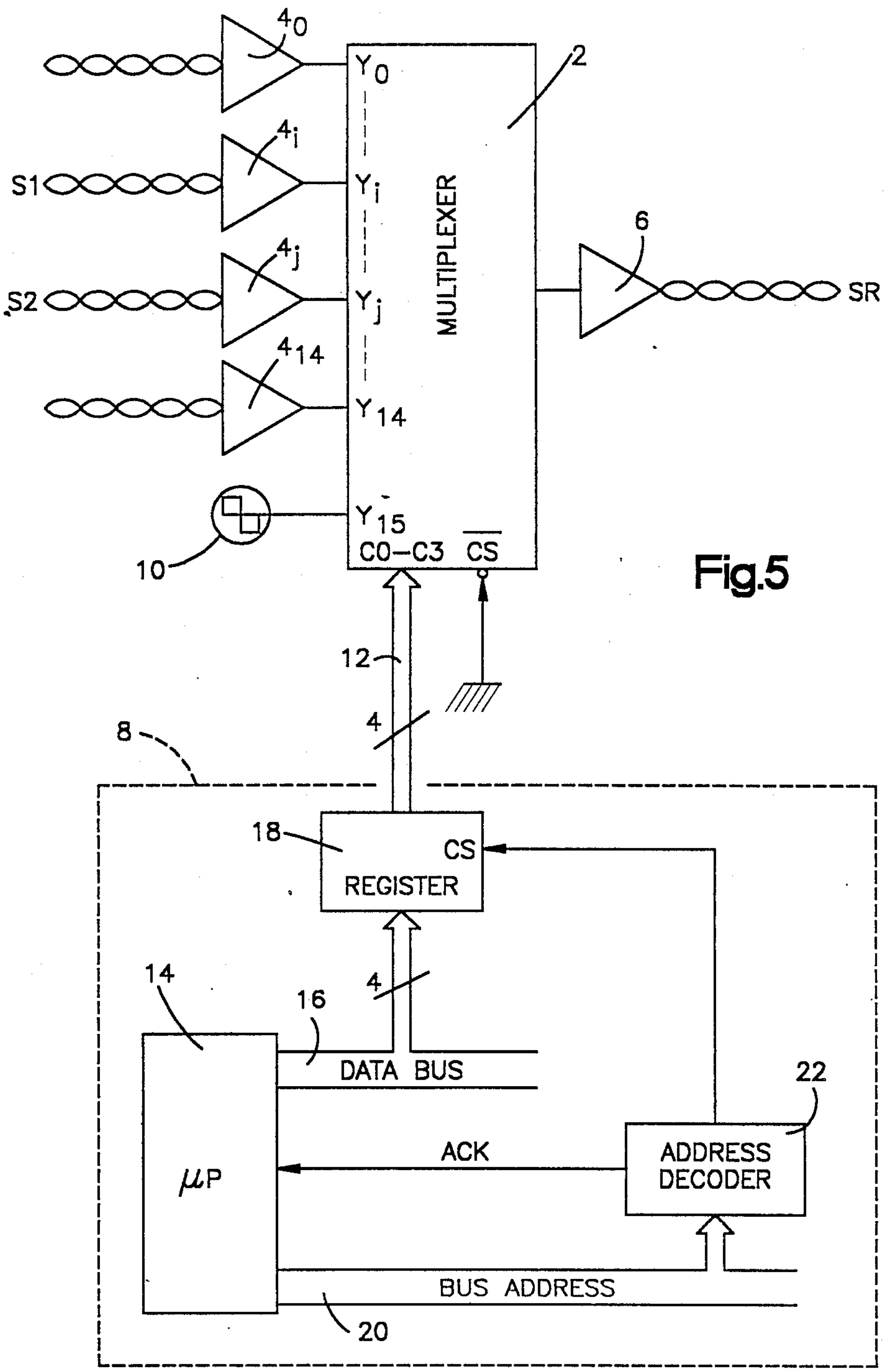
FIG. 5 illustrates a first method of implementation of the invention's system in which the sequence introduced during the switching is a clock signal.

The switching system shown in FIG. 5 includes, in the main, a multiplexer (2) and a control device (8). The switching can also include stages $4_0, \ldots, 4_{15}$, and an output stage (6) placed at the inputs and at the output, respectively, of the multiplexer (2).

The multiplexer inputs are connected to the digital signal emission devices, as well as to the audio-visual production or transmission center equipment interfaces. However, in conformity with the invention, one of the multiplexer (2) inputs is connected to generator (10) for the emission of a predetermined digital signal, for example, a clock signal generator.

The selection of multiplexer inputs is accomplished by a control device (8) by means of a control bus (12). In the method of implementation shown, the multiplexer (2) has 16 inputs $Y_0, Y_1, \ldots, Y_{15}$, and, as a result, the control bus (12) has 4 wires, C0–C3.

The control device (8) has one microprocessor (14); a data bus (16) connected to microprocessor (14); a register (18) whose input is connected to the data bus (16) and whose output is connected to the control bus (12); and address bus (20) connected to microprocessor (14); and an address decoder (22) whose input is connected to the address bus (20), and whose output is connected to a chip selection input on the register (18).

The register (18) is used to store a data element which corresponds to the selection of a multiplexer (2) input, and the address decoder (22) makes it possible to load the contents of the register from the microprocessor data bus.

The switching process implemented by the system shown in FIG. 5 for the switching of an S1 signal applied to the $Y_i$ input of the multiplexer to an S2 signal applied to the $Y_j$ input of the multiplexer is the following. First, the microprocessor (14) delivers to the register (18) a data element which corresponds to the selection of the $Y_{15}$ input of the multiplexer so that the digital signal predetermined by the generator (10) will replace the S1 signal at the multiplexer output. Next, the microprocessor (14) delivers to the register (18) a data element which corresponds to the selection of the $Y_j$ input of the multiplexer.

The predetermined digital signal delivered by the generator (10) may consist, for example, of the constant transmission of the preamble of the frames for the S1 and S2 digital signals, or of any other signal which violates the coding principles used for the coding of the sample signals. In the event that the signals are emitted by the UER/AES studio interface, to which reference was made at the beginning of this description, the generator (10) may emit, for example, a clock signal at 1024 kilohertz, and the interval between the transitions correspond therefore to 1.5 times the length of a bit, which violates the principles of the coding used. In other words, the clock signal from generator (10) has a transition about every ½ microsecond, while the signals from the UER/AES studio interface have one at least every ⅓ microsecond (3.072 megabits per second and biphase encoding).

Figure 6:
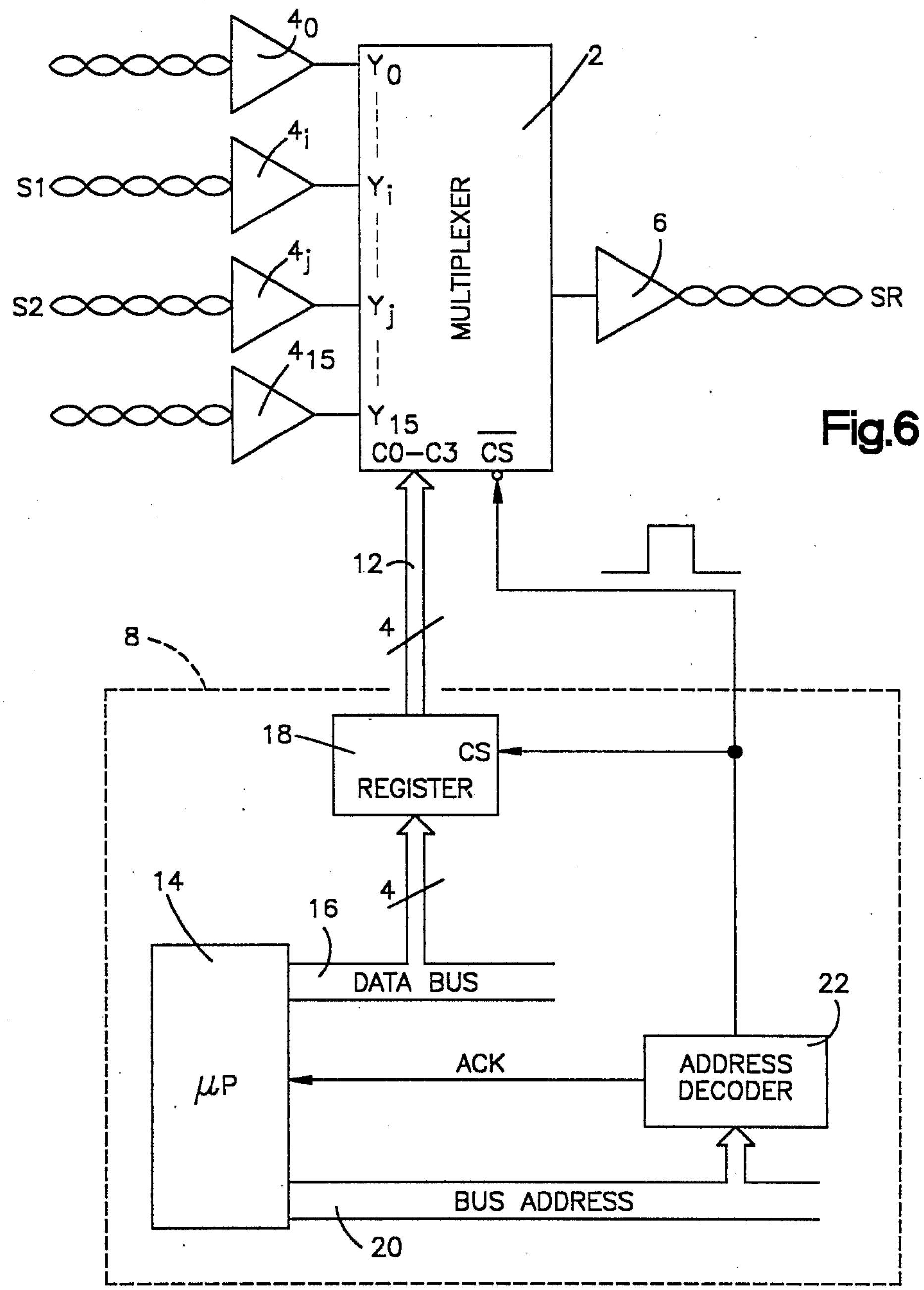
FIG. 6 illustrates a second method of implementation of the invention, in which the sequence introduced during switching is produced by a constant state into the multiplexer output.

A second method of implementation of the invention's switching device is shown in FIG. 6. In this Figure, the items which are identical to those in FIG. 5 carry the same reference numbers. The essential difference with the system in FIG. 5 consists of the fact that there is no provision for a generator for a particular signal connected to one of the data inputs of the multiplexer, and by the fact that the characteristic sequence introduced during switching is a constant logic state resulting from a command impulse applied to the chip selection input of the multiplexer (2).

In this method of implementation, the signal delivered by the address decoder (22) to select the register (18) is also applied to the selection input of the multiplexer (2), in order to de-select the multiplexer and force its entry into a determined state. The signal applied to the selection input of the multiplexer (2) has a length at least equal to 1.5 times the length of a bit. The length of this impulse may be obtained by any appropriate means, such as, for example, proper disposition of the ACK discharge line of the address decoder (22).

Figure 1:
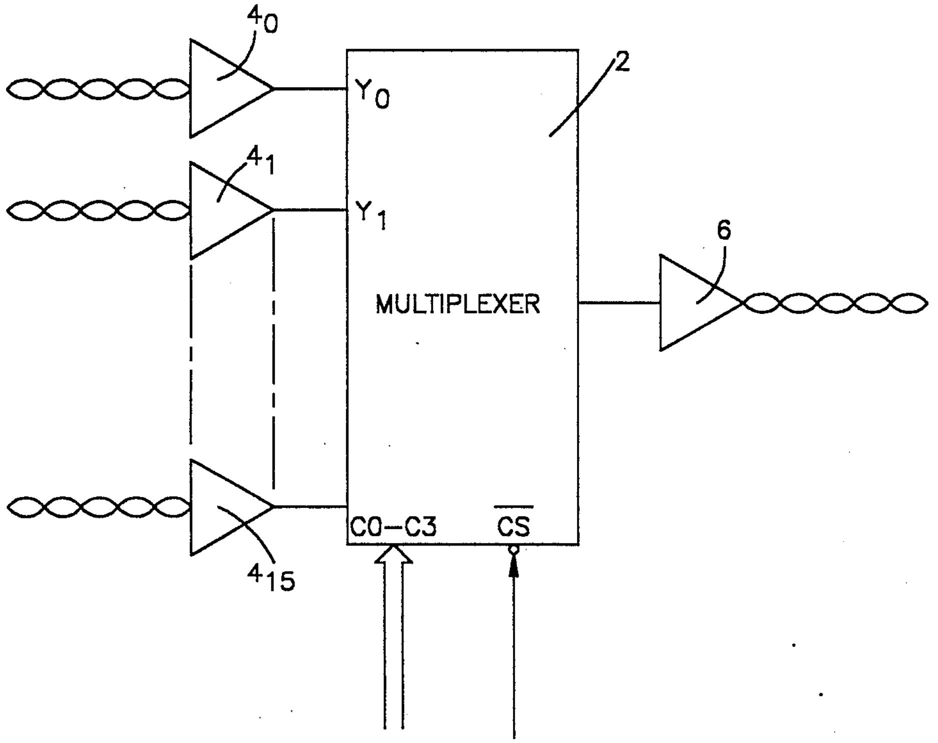
FIG. 1, described previously, illustrates the general structure of a spatial switching system.
Figure 7:
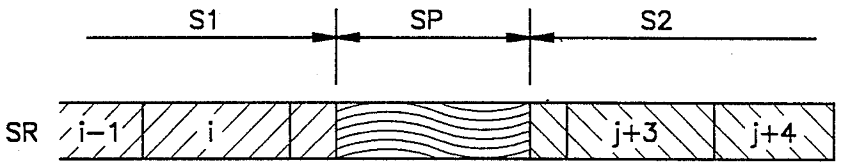
FIG. 7 illustrates the resulting digital signal, SR, produced by the invention's system.
Figure 2:
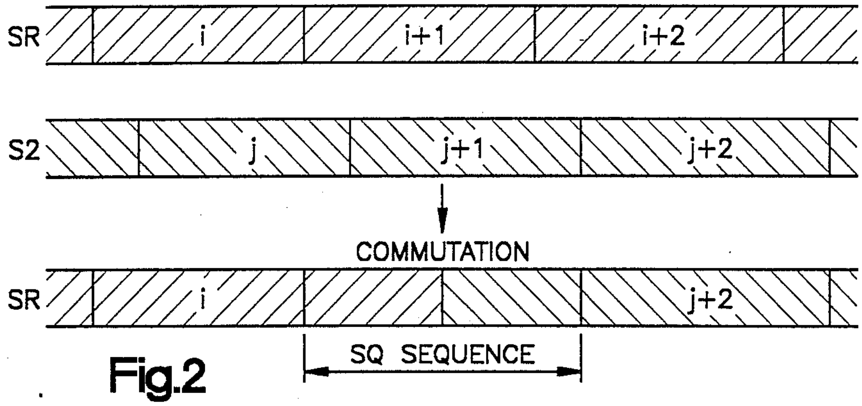
FIG. 2, described previously, represents two asynchronous digital signals, and the signal resulting from the switching between these signals.
Figure 3:
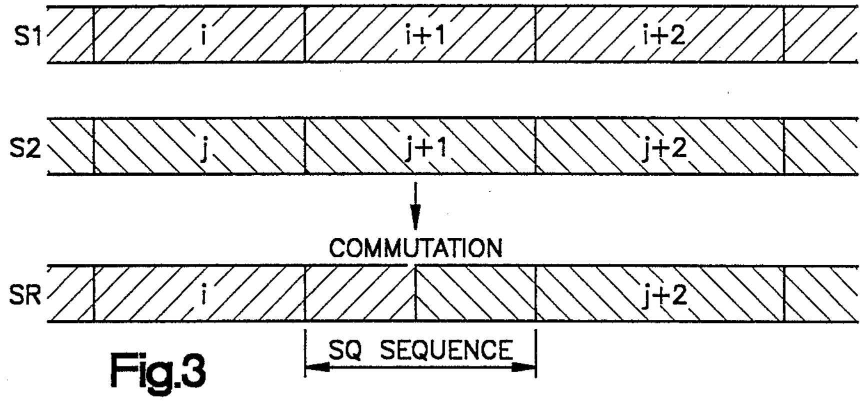
FIG. 3, described previously, represents two synchronous digital signals, and the signal resulting from the switching between these signals.
Figure 4:
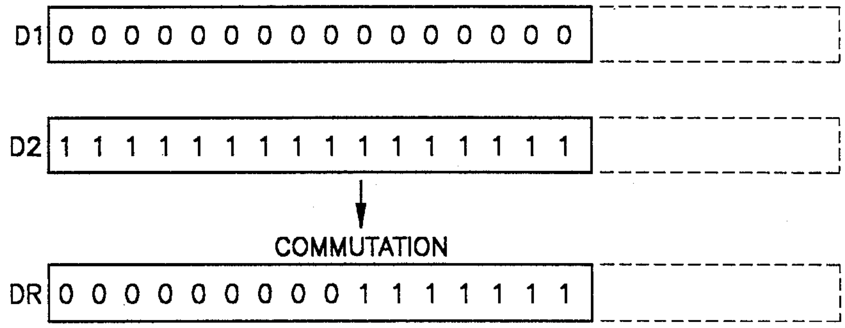
FIG. 4, described previously, shows the appearance of an erroneous data element during the switching between the two synchronous digital signals.

The resultant signal, SR produced in accordance with the invention, by switching between the two digital signals S1 and S2, is shown in FIG. 7.

This SR signal has a particular sequence, SP, inserted between the S1 digital signal and the S2 digital signal. This signal is received by a receiver, which may be included in the UER/AES studio interface, and which is designed in a conventional manner so that it can detect in the appropriate way the transmission and/or code violation errors, and in particular the SP sequence, and so that it can provide appropriate processing of the data received.

I claim:

1. A process for detectably switching between a first digital signal and a second digital signal, the first digital signal being applied to a first input connected to an output and the second digital signal being applied to a second input to be connected to the output instead of said first input, both signals being encoded, the process comprising:

disconnecting the first input from the output;

connecting a characteristic sequence signal to the output;

disconnecting said characteristic sequence signal from the output; and connecting the second input to the output, whereby the output provides an output signal that provides indication of the switching upon decoding.

2. A process according to claim 1, wherein said characteristic sequence signal comprises a signal that is incompatible with said encoding and decoding.

3. A process according to claim 2, wherein said characteristic sequence signal is a clock signal.

4. A process according to claim 2, wherein said characteristic sequence signal is a constant state.

5. A switching device for detectably switching between a first digital signal and a second digital signal, each signal being encoded, the device comprising:

a multiplexer having a first input receiving the first digital signal, a second input receiving the second digital signal, an output, and a control input, said multiplexer being adapted to connect one of said first input, said second input and a characteristic sequence signal to said output according to said control input; and a control device connected to the control input, said control device being adapted to instruct the multiplexer to sequentially disconnect the first input from the output, connect the characteristic sequence signal to the output, disconnect the characteristic sequence signal from the output and connect the second input to the output, whereby the output provides an output signal that provides indication of the switching upon decoding.

6. A device as in claim 5, wherein said characteristic sequence signal comprises a signal that is incompatible with said encoding and decoding.

7. A device as in claim 5, further comprising a generator, said generator providing said characteristic sequence signal.

8. A device as in claim 7, wherein said generator is a clock signal generator.

9. A device as in claim 5, wherein said characteristic sequence signal is a constant state.

10. A device as in claim 9, wherein said multiplexer has a deselection input, said deselection input being able to force the output to the constant state, and said control device being additionally connected to said deselection input, whereby said control device may cause the output to be the characteristic sequence signal.

* * * * *